United States Patent [11] 3,568,627

| [72] | Inventors | Irwin Selinger<br>Flushing;<br>Michael Feingold, Bronx, N.Y. (c/o Surgicot, Inc. 12 N. Cottage St., Valley Stream, N.Y. 11586) |
|---|---|---|
| [21] | Appl. No. | 887,937 |
| [22] | Filed | Dec. 24, 1969 |
| [45] | Patented | Mar. 9, 1971 |

[54] COMBINED RECORD CARD AND STERILIZATION INDICATOR
6 Claims, 1 Drawing Fig.

[52] U.S. Cl. .................................................. 116/114,
23/253, 73/356
[51] Int. Cl. ............................................... G01d 21/00
[50] Field of Search.......................................... 116/114,
114.5, 114.19; 23/253 (TP), 253; 73/61.1, 64, 356, 358

[56] References Cited
UNITED STATES PATENTS

| 1,894,015 | 1/1933 | Berstein | 73/356 |
| 2,579,738 | 12/1951 | Hargreaves | 116/114X |
| 2,826,073 | 3/1958 | Huyck et al | 116/114X |
| 3,114,349 | 12/1963 | Schuman | 116/114 |
| 3,260,112 | 7/1966 | Godbey et al | 116/114X |
| 3,360,338 | 12/1967 | Edenbaum | 23/253 |
| 3,360,339 | 12/1967 | Edenbaum | 23/253 |
| 3,386,807 | 6/1968 | Edenbaum | 23/253 |

Primary Examiner—Louis J. Capozi
Attorney—Jerome Bauer

ABSTRACT: A combined record card and sterilization indicator for use in a sterilizer or autoclave having a sterilization indicator device thereon. A comparison standard may be positioned on the card which is of a material that is unaffected by heat to which the indicator changes in color for comparison with the standard. The card is of such size and shape as to enable its placement strategically within a sterilizer or autoclave and has indices to identify the articles subject to sterilization conditions.

PATENTED MAR 9 1971

3,568,627

Autoclave Record System

The above bar must turn at least as dark as the standard bar to indicate the autoclave load has been exposed to minimum sterilization conditions.

RECORDING CHART THERMOMETER NO. _____

DATE: _____ AUTOCLAVE NO. _____ LOAD NO. _____

LOAD CONTENTS
① _____  ⑤ _____
② _____  ⑥ _____
③ _____  ⑦ _____
④ _____  ⑧ _____

No. of Bundles _____ Operator's Signature _____

EXPIRATION DATE — MO. DAY YR.

INVENTORS
IRWIN SELINGER &
MICHAEL FEINGOLD
BY
ATTORNEY

COMBINED RECORD CARD AND STERILIZATION INDICATOR

The desideratum of this invention is to provide a combined record card and sterilization indicator for use in a sterilizer or autoclave or the like, conveniently referred to as a sterilizer, in which it is customary to sterilize packs or packages of surgical instruments, supplies, equipment and other articles used in surgical procedures. In the past, it has been the practice to place such packs in the sterilizer and subject them to sterilization procedures.

Although the packs are customarily placed in the sterilizer, and the sterilizer is operated with the intent to subject the packs to sterilization conditions, when the sterilizer is unknowingly defective or the packages are improperly wrapped, or incorrectly stacked in the sterilizer, the result is that the packages and their contents may not be properly sterilized. These facts are often not brought to the attention of the surgeon or others involved in the procedures in which such packages are used. Therefore, it is important that each time a package, packages and/or individual items are subjected to sterilization conditions, the operator and others involved in the procedure in which the same is to be utilized must have a clear indication and permanent record of whether the sterilizer or autoclave is operative and whether the articles have, in fact, been subject to the recommended or standardized sterilization conditions. It is also important that the institution in which the procedures are accomplished and/or the personnel using the same be able retain positive identification of such pack, the articles wrapped therein, and proof of the fact that they have been subjected to sterilization conditions and that the sterilizer was operating correctly before the sterilization procedure.

There are standard techniques and procedures which have been promulgated for the use of sterilizers to assure that each pack and the articles contained therewithin are sterilized. Thus, it is incumbent upon the operator to follow the practices and techniques of his particular institution or office, and it is, therefore, to this purpose that the present invention is directed.

An object of the invention is to provide a combined sterilization indicator and permanent record card that may be reliably employed in a sterilizer or the like to indicate whether the same is operating properly.

Another object is to provide a combined sterilization indicator and permanent record card that may be contained conveniently, wholly within the package to be sterilized so that when the package is subsequently opened for use, the invention will provide an immediate and positive visual indication of the package contents and of whether the contents have been subject to sterilization conditions. A feature of the invention enables a positive identification of the package and its contents, and a subsequent permanent record for further consultation, verification, and/or cross-checking as to the precise nature and identification of the articles treated to sterilization, and proof of that fact.

Another object of the invention is to provide a device that may be inserted and included wholly within the package prior to its insertion into the sterilizer apparatus, so that all possibility of contamination of the interior of the package after sterilization by way of the present invention is obviated. Thus, in the past, it has been the practice to provide sterilization indicators which have extended into the package, but which have had portions thereof extending beyond the package for various reasons. It has been found that under such conditions of use, the extended portions of the indicators provide a conduit along which contaminating pathogens obtain access from the exterior of the package to the interior of the package and, thus, contaminate the interior of the package even after the same has been subjected to sterilization conditions. Thus, the object of this invention is to overcome such prior art deficiencies as well as to provide an indication of the correct functioning of the sterilizer, autoclave and other apparatuses used for sterilization.

The invention is illustrated by way of example in the accompanying drawing which forms a part of this application and which illustrates a preferred embodiment of a combined sterilization indicator and permanent record card according to the teaching of the invention.

Referring now to the drawing, the combined record card and sterilization indicator is generally identified by the numeral 10. Card 10 may be of any suitable material able to withstand the conditions to which the same are subjected during the sterilization of the articles and the packs with which they are placed into the sterilizer. Since the card 10 performs a sterilization indicator function in addition to serving as a permanent record of the articles subjected to sterilization, it is desirable that the same have a substantial strength or body to resist accidental tearing and cracking.

In this regard, the card 10 may be of s semirigid material. In addition, the card must not discolor adjacent materials and must maintain the readability of symbols imprinted on it. The card 10 must have good heat-resistant properties such as to enable it to perform admirably under the conditions to which it is subjected in the sterilizer. The card stock material must also have sufficient rigidity to hold its body, resist creasing and tearing while still being sufficiently flexible to be bent to conform to the shape of the article and package within which it is to be used. Its weight and thickness must be such as to conform to that of conventional file cards long used in office filing systems.

Contained on the card 10 is a sterilization indicator means 12 that may be of any desired configuration or shape but which is intended to extend for a substantial portion of the length of the card that has edges 14 and 16. The present card 10 is of such length and height as to enable the same to be placed in the sterilizer prior to actual use of the same with packs so as to prove the same is functioning properly or to be inserted or positioned wholly within the pack. Hence, the size and shape of the card 10 is preferably smaller than the package into which it is to be included. The sterilization indicator means 12 has been shown in rectangular form so as to extend for a substantial portion of the length of the package in which it is contained. The indicator means 12 may be composed of any one or more of the many well known color changeable heat, steam or radiation sensitive compositions commonly used in the art of sterilization indicators such as disclosed in U.S. Pat. to Edenbaum, No. 3,360,338. Such compositions may be applied to the card 10 in one or more desired colors and when subjected to minimum standard sterilization conditions, such compositions change to another color or colors.

In the practice of the invention, it has been found that when the card 10 is to be used to indicate whether a package has been subjected to sterilization conditions, it is important to include the whole of the card 10 and its attendant details completely within the confines of the package. This will insure that both the card 10 and the pack are simultaneously treated and subjected to the same conditions with the card 10 being the indicator and subsequently serving as the record of the fact that the pack has been subjected to the minimum standard sterilization conditions. Moreover, and unlike prior art devices such as that disclosed in U.S. Pat. No. 3,114,349, the present invention obviates the possibility of contamination of the contents and inner surfaces of the package by the use of the present invention, insofar as transmission via the control is concerned. The card 10 is shaped and sized such that it will fit completely within the pack because it has been found that if any portion of an insert into the pack extends outward beyond the confines of the pack, such extending portion provides a bridging pathway along which contaminants in the atmosphere are permitted and afforded access to travel into the interior of the pack beginning immediately after the sterilization procedures are completed.

Positioned on the card 10 and immediately abutting the indicator means 12 in horizontal alignment is a comparison standard 18 here shown as a rectangular bar. The comparison standard 18 is intended to form a coextension of the indicator means 12 so that there is an immediate comparison between the two simply by viewing one in relation to the other. However, as the description proceeds, those skilled in the art will readily recognize that the indicator means 12 and the comparison standard 18 need not be in abutting relation with each other and, therefore, the particular shape of such structural details need not necessarily be rectangular as shown. The standard 18 is applied to the card in the color to which the indicator means 12 is required to change when the same is subjected to proper minimum standard sterilization conditions. The paint or ink is ink type A-6407 supplied by Superior Printing Ink Co. Inc. of New York City used to apply the standard 18 is of such material as to remain unaffected and unchangeable in color when it is simultaneously subjected to the same conditions of sterilization as the responsive indicator means 12.

Thus, there is an immediate ability to visually observe which portions of the indicator means 12 have changed in color to correspond to the comparison color of the standard 18. It sometimes happens that portions of the sterilizer or the pack into which the card 10 is inserted will be subject to sterilization conditions while others will not; therefore, variations in color along the indicator means 12 may result. These variations in color exhibit the fact that not all portions of the sterilizer or pack have been subject to the minimum standard sterilization conditions.

In this way, and by making a careful comparison between the colors of the indicator means 12 and standard 18 after the sterilizer has been run through a test cycle or the pack is subjected to minimum standard sterilization conditions, the user will be able to determine whether the sterilizer is operating properly or interior of the pack has been treated to the minimum standard sterilization conditions or whether only portions thereof have been so treated. Thus, by observing the location of variations in color along portions on the indicator means 12, the user will be able to perceive which portions of the sterilizer are defective or the pack have not been so minimally treated. To aid in this understanding and recognition, the indicator means and standard 12 and 18 are identified with the notation that the indicator means 12 must turn to the color of the standard 18.

Defined on the card 10 for permanent record-keeping purposes and to aid in the assurance that the pack into which the same is fully positioned has been exposed to the minimum standard sterilization conditions are indices means generally identified by the numeral 20. The indices means 20 may comprise one or more article identification symbols illustrated in an exemplary manner by the circled numerals "1 to 8" inclusive and each numeral accompanied by an identification line. The identifying numerals "1 to 8" enable the user of the card 10 to legibly mark on each line a corresponding identification of the contents of the pack in which the card is incorporated and/or an identification of the particular sterilizer used.

In practice, it has been found most convenient to enclose the identification numerals "1 to 8" or other symbols so employed in a field o—f sensitive or responsive substance 22 that may be of the same composition and characteristics as the substance of the indicator means 12. In this manner, when the indices 20 is simultaneously subjected to sterilization conditions with the indicator means 12, both change from their original color to essentially that of the comparison standard 18 and, thus, serve to indicate at the respective locations on the card 10 whether further and larger areas of the pack have been subjected to sterilization conditions. By thus positioning the indicator means 12 over a broad and larger area of the card 10 and including the indices numerals or symbols thereof in areas of responsive and sensitive substances 22 and by spacing such indices 20 from the indicator means 12, it can be observed whether a substantial portion of the pack has, in fact, been subjected to sterilization conditions or whether the sterilizer is operating properly.

Completing the record system of the card 10 is an interposed area between the spaced indicator means 12 and its comparison color standard 18 and the indices means 20. In this interposed area is room for additional information important in record keeping. Such information should include the listing of a reference to the particular temperature recording device utilized in determining the sterilizer temperature, the date of sterilization, the sterilizer number and the load number, so that a more positive identification can be made of the recording thermometer and provide a positive record in the event its accuracy is questioned at a later time. The particular sterilizer number and load number will more precisely relate the contents of the pack in which the card 10 has been utilized with the sterilizer and the remaining packages contained in the same load positioned at the same time within the sterilizer for sterilization. It may also be important to indicate the number of the bundles or packs contained in the load placed in the sterilizer and the signature of the operator such that the authenticity of the card 10 may be proven at a later time.

Positioned along and adjacent to the edge 14 is a notation regarding the expiration date upon which it is deemed or believed that the contents of a pack are no longer considered sterile. This information may be applied to the card at the time the card is placed into its respective pack so that when the card is removed from the pack, the expiration date information will become an integral part of the card.

It should be apparent to those skilled in the art that the present combined permanent record card and sterilization indicator obviates the use of numerous sterilization indicators and enables the immediate completion of the record card before the packs are placed into the autoclave. By combining these details in the novel manner disclosed herein, the present invention functions to indicate whether the pack within which it is wholly contained has been subject to minimum standard sterilization conditions and by the prior completion of the card before inserting the same in its corresponding pack, the card will then serve as an accurate and permanent record to prove all the information necessary in the event any question is raised as to the sterility of the pack and its contents at the time the same are subsequently used.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. In a combined permanent record card and sterilization indicator for use in a sterilizer wherein one or more of such cards are adapted to be strategically positioned within the sterilizer and into which packs of sterilizable articles are positioned for sterilization, the invention comprising:

a semirigid card having a sterilization indicator and a comparison standard thereon;

said sterilization indicator being of a sensitive substance positioned on and along a substantial extent of said card:

said sterilization indicator substance being of a color variably changeable to another color along portions thereof when corresponding locations of the sterilizer are subjected to varying conditions of sterilization;

said comparison standard being adjacent said sterilization indicator;

said comparison standard being of a color different from said color of said sterilization indicator to indicate the desired color to which the sensitive substance of said sterilization indicator must change to evidence that the corresponding portions along said sterilization indicator have been subjected to desired sterilization conditions;

said standard being of a substance to remain unaffected and unchangeable in color when simultaneously subjected to the same conditions of sterilization as said sensitive substance;

and indices means on said card identifying the articles with which said card is employed to indicate that the same have been subjected to the desired sterilization conditions.

2. In a combined permanent record card and sterilization indicator as in claim 1,
said indicator being in the shape of an uninterrupted rectangular bar extending for a length of the card,
and said comparison standard being positioned abutting said indicator to provide for an immediate, uninterrupted and continuous color comparison between said comparison standard and said indicator.

3. In a combined permanent record card and sterilization indicator as in claim 2, wherein said indices means on said card identifies on said card the articles simultaneously subjected to sterilization with said record card and the date said articles where subjected to sterilization, including the expiration including the expiration thereof.

4. In a combined permanent record card and sterilization indicator as in claim 3, said indices means including a sensitive substance of one color whereby the change thereof from said one color to that of the comparison standard serves to indicate that the respective location on said card has been subjected to sterilization conditions.

5. In a combined record card and sterilization indicator as in claim 4, said indices means being spaced from said indicator means on said card.

6. In a combined record card and sterilization indicator as in claim 2, said record card and sterilization indicator thereon being of such size and shape as to be positioned wholly within the package to be subjected simultaneously to sterilization therewith so that no part of said card or indicator extends beyond the confines of the package to be contaminated by the surrounding atmosphere.

PO-1050
(5/69)

UNITED STATES PATENT OFFICE
CERTIFICATE OF CORRECTION

Patent No. 3,568,627            Dated March 9, 1971

Inventor(s) Irwin Selinger and Michael Feingold

It is certified that error appears in the above-identified patent and that said Letters Patent are hereby corrected as shown below:

IN THE CLAIMS:

Claim 1, Line 5, after "comprising" delete the colon and substitute -- , --

Claim 1, Line 6, change "semirigid" to -- semi-rigid --

Claim 1, Line 7, change the semicolon to a -- , --

Claim 1, Line 9, after "card" change the colon to a -- , -

Claim 1, line 13, after "sterilization" change the semicol to a -- , --

Claim 1, Line 15, change the semicolon to a -- , --

Claim 1, Line 21, change the semicolon to a -- , --

Claim 1, Line 25, change the semicolon to a -- , --

Claim 3, Line 5, delete "including the expiration"

Signed and sealed this 13th day of July 1971.

(SEAL)
Attest:

EDWARD M. FLETCHER, JR.           WILLIAM E. SCHUYLER, JR.
Attesting Officer                  Commissioner of Patents